United States Patent [19]

Föhl

[11] Patent Number: 4,629,214
[45] Date of Patent: Dec. 16, 1986

[54] FEED DEVICE FOR A SAFETY BELT SYSTEM FOR MOTOR VEHICLES

[75] Inventor: Artur Föhl, Schorndorf, Fed. Rep. of Germany

[73] Assignee: TRW Repa Feinstanzwerk, Alfdorf, Fed. Rep. of Germany

[21] Appl. No.: 572,642

[22] Filed: Jan. 20, 1984

[30] Foreign Application Priority Data

Jan. 25, 1983 [DE] Fed. Rep. of Germany ....... 3302356

[51] Int. Cl.⁴ ...................... B60R 21/10; A62B 35/02
[52] U.S. Cl. .................................................... 280/808
[58] Field of Search ............... 280/801, 804, 808, 807; 180/270

[56] References Cited

U.S. PATENT DOCUMENTS 3,781,061 12/1973 Walz et al. ........................... 280/807
4,175,633 11/1979 Andres et al. ....................... 180/270

FOREIGN PATENT DOCUMENTS 2713172 10/1978 Fed. Rep. of Germany ...... 280/804

Primary Examiner—John J. Love
Assistant Examiner—Kenneth R. Rice
Attorney, Agent, or Firm—Yount & Tarolli

[57] ABSTRACT

The feed device for a safety belt system for motor vehicles has an automatic belt roll-up, a belt lock and a locking tongue, a feed ram being movable, through a drive device, in two opposite directions, which at the free end is loosely coupled with the section of the belt band having the locking tongue, which moves the belt band and the locking tongue, for the putting on of the belt, into a convenient position in front of or to the side of the vehicle's passenger, and then back again into the original position.

To make possible the installation of the feed device even into a narrow space, it is provided, according to the invention, that a ram receiver is present, of which the projection length perpendicular to the base plane of the vehicle, is much less than the length of the feed distance through which the feed tappet must pass.

10 Claims, 9 Drawing Figures

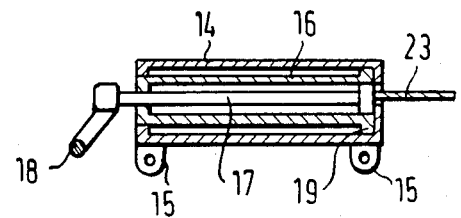
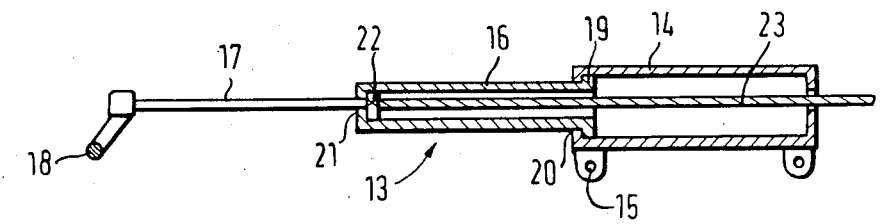
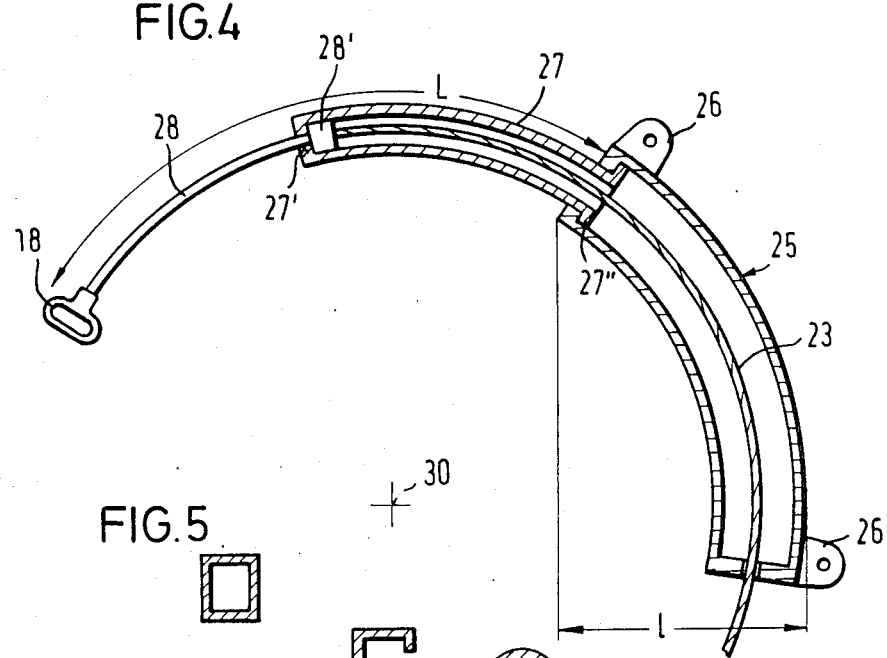

FEED DEVICE FOR A SAFETY BELT SYSTEM FOR MOTOR VEHICLES

The invention relates to a feed device for a safety belt system for motor vehicles.

In ordinary commercial safety belt systems with automatic belt roll-up, belt lock and belt band locking tongue, the belt band section bearing the locking tongue, in the non-applied position, runs along the B post of the motor vehicle behind the back of the person to be secured. In applying the belt, the passenger of the vehicle must reach relatively far back in order to grasp the locking tongue and then insert it in the belt lock. to prevent such an inconvenient mode of use, a feed device is known, in connection with a safety belt system, which consists mainly of a ram, designed as a rigid straight toothed rack, an electric driving motor and toothed pinion. The belt band is loosely coupled to this ram. It must have a length which corresponds to the length of the feed distance, so that with the driving of the toothed rack, the locking tongue, coupled indirectly, through the belt band, with the toothed rack can be carried far enough into a position in height favorable for grasping or in front of the vehicle's passenger. After insertion of the locking tongue into the belt lock, the toothed rack is moved back into the original position. Because of the great length of the straight-line feeding ram, this feed device is only used in two-door motor vehicles, in which, behind the front seat, sufficient installation space for the feed device is present. In four-door vehicles, such a feed device cannot be used.

The invention attacks the problem of improving a feed device so that only a little installation space is needed for its placing, and which can also be used in four-door vehicles.

This problem is solved, according to the invention, by the fact that a ram receiver is provided of which the projection length, perpendicular to the base plane of the vehicle, is much less than the length of the feed distance to be passed through by the feed ram. Preferably, the feed ram consists here of several telescopically cooperating ram parts.

Through the measures according to the invention it is achieved that the feed device has a very small construction size, which allows the installation of the feed device into the B post of the vehicle, for example. Particularly with the use of telescopically cooperating ram parts, the feed distance can be much greater than the length of the ram receiver.

According to one advantageous embodiment of the invention, the preferably tubular ram receiver is curved in an arc, at least a predominant part of its length running at an angle to the base plane of the vehicle, and in it, the feed ram on the telescopic ram parts are supported movable in arc form. Through the curved design of the ram receiver and feed ram, it is possible to place at least a substantial part of the feed device in a practically vertical position in the B post of the vehicle, that is, in a very narrow space. The feed ram, also in arc form, moves, with its carrier eyelet receiving the belt bank, in the feed direction, along an arc-form feeding path, into the position favorable for grasping. It is advantageous here if the ram receiver and the feed ram, the ram parts, consist of a material which can be deformed as necessary, so that the presentation path of the carrier eyelet can be changed according to the type of vehicle.

According to a further development of the invention, the tubular ram receiver has a cross section deviating from the circular form. In this way it is achieved that the feed ram or ram parts, having a corresponding cross section, are supported, secure against twisting, and can be moved along in relation to the ram receiver.

According to another embodiment of the invention, the device for the feed ram or ram parts has a motor-driven flexible push and pull means. By this measure, also, the installation space needed for installing the feed device is kept very small, since the feed ram can be connected, through the flexible push and pull means, with one at another place, for example, directly above the floor of the vehicle, thus, for example, at the bottom end of the B post. For the push and pull means may advantageously be provided a drum storage drive or a rolling friction device.

According to an alternative embodiment of the invention, the ram receiver is designed as a pressure cylinder and preferably connected directly, for the moving of the ram part or parts supported pressure-tight therein, with a pressure medium source. (For example, feed movement by over pressure; return movement by under pressure (vaccum).)

It is advantageous, moreover, if the drive device can be switched on preferably by a switch actuated by the door of the vehicle or by the ignition device of the vehicle, into feed operation, and by a switch arranged in the belt lock, and actuated by the insertion tongue, into reverse operation. With this, with completion of the application (buckling up) process, the feed ram is automatically brought back into its inactive rest position.

The invention is explained from examples of execution represented in the drawings and described below.

FIGS. 3A and 3B show the feed device according to Fig. 1 is a detail in rest position and in active position.

FIG. 4 shows the feed device according to FIG. 2 as a detail in active position.

FIGS. 5 to 8 show various cross section forms of the ram receiver for the feed devices according to the preceding figures.

Figure 1:
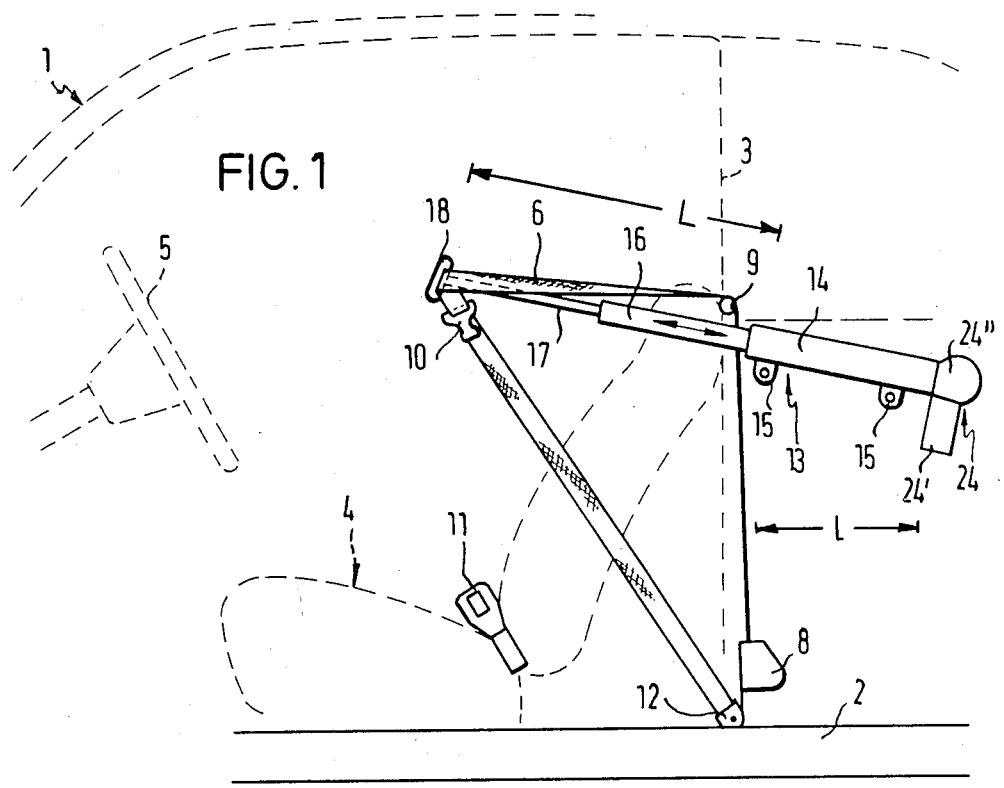
FIG. 1 shows a first form of execution of the feed device according to the invention, mounted in a motor vehicle, in active (actuated) position.
Figure 2:
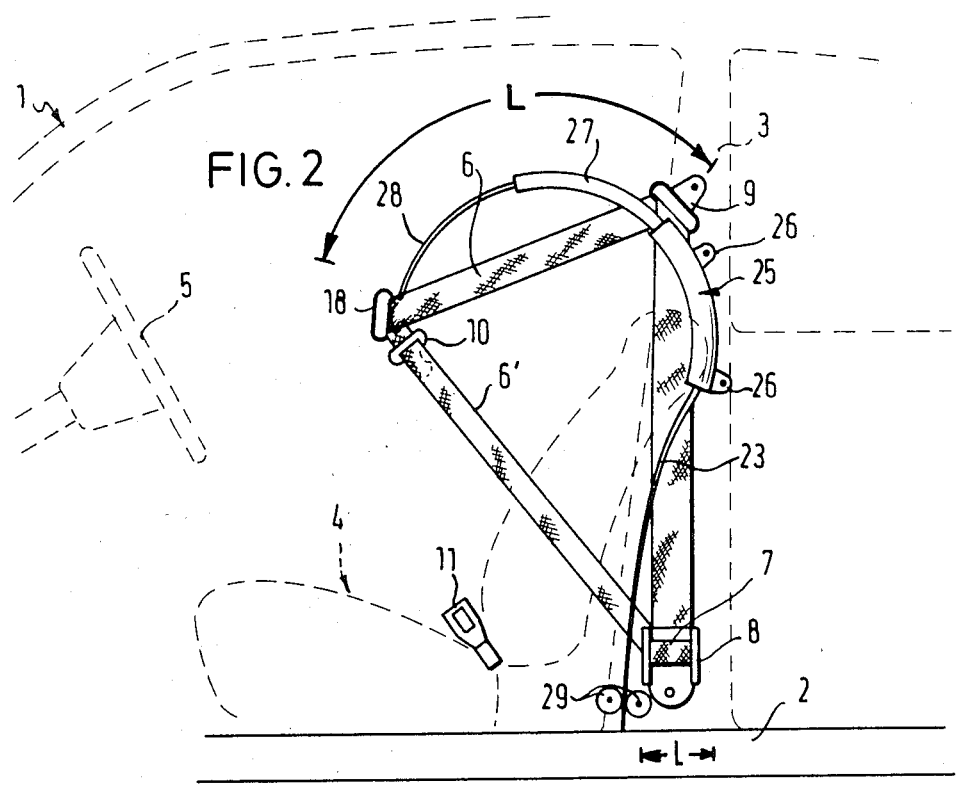
FIG. 2 shows a second form of execution of the feed device according to the invention, mounted in a motor vehicle, in the active position.

In FIGS. 1 and 2 is indicated schematically a passenger car 1 with base frame 2 (sills), B post 3, vehicle seat 4 and steering wheel 5. This is a four-seat vehicle. 6 is a safety belt band which is wound on the belt spool 7 of an automatic roll-up 8, known per se, which is conducted and turned through a turning stop 9, which bears on a belt band section 6' a locking tongue 10, which can be inserted into a belt lock or buckle 11, placed on the other side of the seat, and of which the other free end is fastened by an end stop 12, near the sill.

In the example of execution according to FIGS. 1, 3A and 3B, a feed device 13 is provided, with straight-line mobility, or straight feed path of the feed ram. It consists mainly of a short, straight-line ram receiver 14, which is fastened rigidly, by means of stop eyelets 15 on the motor vehicle, for example, on the B post of the motor vehicle. In the tubular ram receiver 14, supported movable in the direction of the double arrow, are two telescopically cooperating ram parts 16 and 17, forming a feed ram. The outer ram part 17 has at its free end a carrier eyelet 18, which is angled in relation to the ram part 17. The ram part 17 is designed tubular and has a flange-like stop 19, by which the ram part 16, in the extended position, strikes against the wall surrounding a guide opening 20 of the ram receiver 14. This ram part 16 has also, like the ram receiver 14, a guide opening 21, into which the ram part 17, smaller in diameter, is guided movable, the said ram part 17 also having a stop 22, through which the feed movement is limited. As shown particularly in FIGS. 3A and 3B, in direct connection with the outer ram part 17 is a flexible push and pull means 23, which is connected at its other end with a drive device, not further represented. This drive device may consist for example, of an electric motor device with a drum storage on which the push and pull means 23 can be rolled up and driven by same. But there may also be provided, in the course of the path of the push and pull means 23, motor-driven friction rolls. In the example of execution according to FIG. 1, such a drive device is marked 24, which has an electric motor drive 24' and a drum storage drive 24" in the housing. The push and pull means 23 is, for example, designed as a monofil plastic cable or a so-called Bowden pull, and can transmit the push and pull forces from the drive device to the feed ram (in the example of execution, to the ram part 17). After the entrance of the vehicle's passenger, the drive device is switched on, for example, by means of a switch arranged on the door, and the ram parts 16 and 17 are carried, from the rest position according to FIG. 3A, into the extended position according to FIG. 3B, by the push and pull means 23. In this position, the carrier eyelet 18, and thus the belt band and the locking tongue 10 are in a good position for grasping, at the level of the vehicle seat. After the putting on of the belt and after the insertion of the locking tongue 10 into the belt lock 11, a switch arranged in the belt lock 11 is actuated, by which a reverse drive movement is given to the drive device; that is, the push and pull means 23 is drawn in the opposite direction and the ram parts 16 and 17 are again moved into the rest position according to FIG. 3A, in which they are pushed together and thus arranged with saving of space.

In the example of execution according to FIGS. 2 and 4, a ram receiver 25, also tubular, bent in an arc, is provided, which is also rigidly fastened, by means of mounting eyelets 26, permanently to the vehicle, for example, directly to the B post 3. The mounting position of the ram receiver 25 is such that it runs, by practically its whole length, at an angle to the base plane of the vehicle (base frame 2); that is, it is fastened practically erect on the very narrow B post 3 and practically does not extend beyond the latter to the side. Preferably, the ram receiver 25 is tucked away behind a post covering, not shown. In the tubular ram receiver 25 is supported a first ram part 27, also curved in an arc, with guide opening 27' and stop 27", and in this tubular ram part 27 is supported movable, again in arc form, a second ram part 28, curved in an arc, with stop 28' and carried eyelet 18. In this example of execution also, to the outer ram part 28, smaller in diameter, is fastened directly a flexible push and pull means 23, connected as described with a drive device. In the present example of execution, a roller friction drive 29 is provided, with two friction rolls, arranged on each side of the conduction path of the push and pull means 23, which (rolls) can be driven in different directions of rotation, by a drive motor, not shown. This roller friction drive is arranged immediately next to the base frame 2 at the foot end of the B post 3, to save space. In connection to the roller friction drive 29, the flexible push and pull means 23 can be wound up on a storage roll. As described, here also, after the putting on of the safety belt and after the insertion of the locking tongue 10 into the belt lock 11, the drive device is actuated and the ram parts 27 and 28 are moved back again, from the active (actuated) position shown in FIG. 2, into the rest position, in which the carrier eyelet 18 still projects from the B post 3.

In FIGS. 5 to 8 are represented some possible forms of cross section for the tubular ram receiver, for example, a square profile, according to FIG. 5, an oval profile according to FIG. 6, and an open, C-shaped profile according to FIG. 7. A circular profile according to Fig. 8 is also possible, but in this case the feed ram and thus the carrier eyelet 18, is not secured against twisting. The cross section form of the feed ram or ram parts is also selected according to the above-mentioned cross section forms.

Within the present invention, it is also possible to provide, instead of two or more ram parts, a single feed ram, which is possible especially in the example of execution according to FIGS. 2 and 4, that is, with practically vertical arrangement of the ram receiver. In the example of execution according to FIGS. 2 and 4, the ram receiver 25 and the ram parts 27 and 28 are curved in an arc with the midpoint at 30. Naturally it is also possible, within the invention, to choose another form of arc or to form the said parts of such a material that the form of curvature or arc can be varied later, and can be adapted in the installatin conditions in the particular type of vehicle.

In view of the foregoing description, it is apparent that a feed device 13 constructed in accordance with the present invention is used to position the locking tongue 10 of a safety belt 6 at a location where it can be readily grasped by an occupant of a vehicle. The feed device 13 includes a feed ram with a tubular receiver member 14 which is secured at eyelets 15 to the body of a vehicle. A second tubular member 16 is telescopically received in the receiver 14. A third member 17 is telescopically received in the second tubular member 16 and has a free end with a carrier eyelet 18 which loosely engages the belt 16 adjacent to the tongue 10.

A drive device 24 moves the second tubular member 16 and the member 17 relative to the receiver member 14. The second tubular member 16 and member 17 are moved between a retracted condition (FIG. 3A) and an extended condition (FIGS. 1 and 3B). When the members 16 and 17 are in the extended condition of FIGS. 1 and 3B, the tongue 10 can be readily grasped by an occupant of a vehicle.

When the ram assembly is in the retracted condition of FIG. 3A, it has a relatively short length as projected vertically onto a base plane of the vehicle body. Due to the telescopic relationship between the members 14, 16 and 17 when the ram assembly is in the retracted position, the members can be extended to move the free end of the member 17 through a substantially greater distance than the length of the ram assembly when it is in the retracted condition. Thus, the receiver member 14 into which the ram assembly is retracted has a length 1 (FIG. 1) projected vertically onto the base plane of the vehicle body. The feed distance through which the belt 6 is moved upon extension of the ram assembly is approximately equal to the length L (FIG. 1). It is apparent that the total feed distance L is substantially greater than the length 1 of the ram receiver 14 as projected vertically onto a base plane of the vehicle body.

I claim:

1. A feed device for feeding a seat belt of a safety belt system of a vehicle into a predetermined position in front of a vehicle seat occupant, said safety belt system, comprising two interlockable parts for fixing the seat belt around the vehicle seat occupant, said feed device comprising a feed ram for moving said belt into said predetermined position and drive means for moving said feed ram in opposite directions, said feed ram comprising a fixed arcuate tubular ram receiver extending substantially vertically along the B post of the motor vehicle, a plurality of arcuate members telescopically movable along an arc relative to each other between an extended position in which said feed ram holds the seat belt in said predetermined position and a retracted position in which major portions of said plurality of members are telescopically received within said tubular ram receiver, and means enabling said ram receiver to be fixed to the B post.

2. A feed device according to claim 1 wherein a carrier eyelet through which the seat belt extends is located on an end of the feed ram.

3. A feed device according to claim 1 wherein said ram receiver has a noncircular cross section.

4. A feed device according to claim 1 wherein said ram receiver and said plurality of members are formed of a deformable material.

5. A feed device according to claim 1 wherein said drive means comprises a flexible drive member for moving said arcuate members between the retracted and extended positions and a motor drive operable to apply a force to said flexible drive member.

6. A feed device according to claim 1 comprisng a first switch actuatable by a car door or the ignition for actuating said drive means for moving said feed ram into the extended position and a second switch actuatable upon interlocking of the two interlockable parts for actuating said drive means for moving said feed ram into the retracted position.

7. A feed device according to claim 5 comprising as drum storage means for storing said flexible drive member.

8. A feed device according to claim 5 wherein said motor drive includes a roller friction drive.

9. A feed device according to claim 1 wherein said drive means is positionable on the floor of the vehicle.

10. A feed device according to claim 1 wherein said ram receiver is a pressure cylinder connected to a pressure source.

* * * * *